United States Patent [19]

Jörg

[11] Patent Number: 4,883,015
[45] Date of Patent: Nov. 28, 1989

[54] END PLATE FOR A RAM-WING BOAT

[76] Inventor: Günther W. Jörg, Odenwaldring 24, 6101, Gross-Bieberau, FRG, Fed. Rep. of Germany

[21] Appl. No.: 216,603

[22] Filed: Jul. 8, 1988

[30] Foreign Application Priority Data

Jul. 16, 1987 [DE] Fed. Rep. of Germany ....... 3723487

[51] Int. Cl.⁴ .................................................. B63B 1/16
[52] U.S. Cl. ..................................... 114/272; 180/121; 244/2
[58] Field of Search ................. 114/271, 272, 273, 61, 114/67 A; 244/12.1, 105; 180/116, 117, 120

[56] References Cited

U.S. PATENT DOCUMENTS

| 3,662,854 | 5/1972 | Bertin | 180/116 |
| 3,830,448 | 8/1974 | Lippisch | 244/12.1 |
| 4,365,578 | 12/1982 | Schellhaas | 114/272 |

Primary Examiner—Joseph F. Peters, Jr.
Assistant Examiner—Jesus D. Sotelo
Attorney, Agent, or Firm—Fidelman & Wolffe

[57] ABSTRACT

An end plate is provided for a ram-wing boat having two airfoils (7-8) and (7a-8a), in the form of ailettes, disposed at a distance from each other and in tandem at approximately the same height, which airfoils are connected with each other at their outer ends by flat end plates (1). Each end plate (1) is configured as a hollow body with an essentially trapezoidal cross section, and consists of upper chord (2) and lower chord (3) connected by planking (4 and 5) along the length thereof. To complete the static assemblage, ribs (6) which divide the hollow body into compartments (9) are disposed at a distance from each other in the hollow space of the end plate (1).

6 Claims, 2 Drawing Sheets

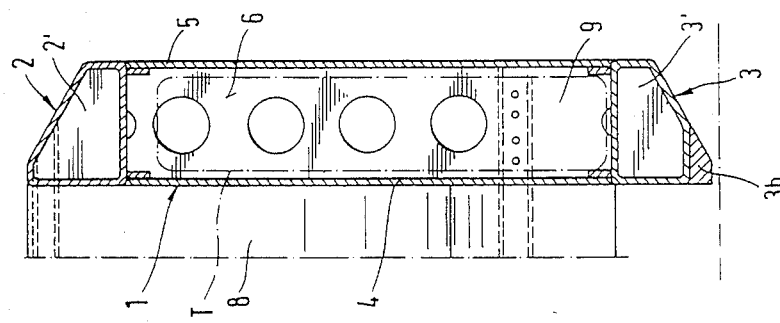
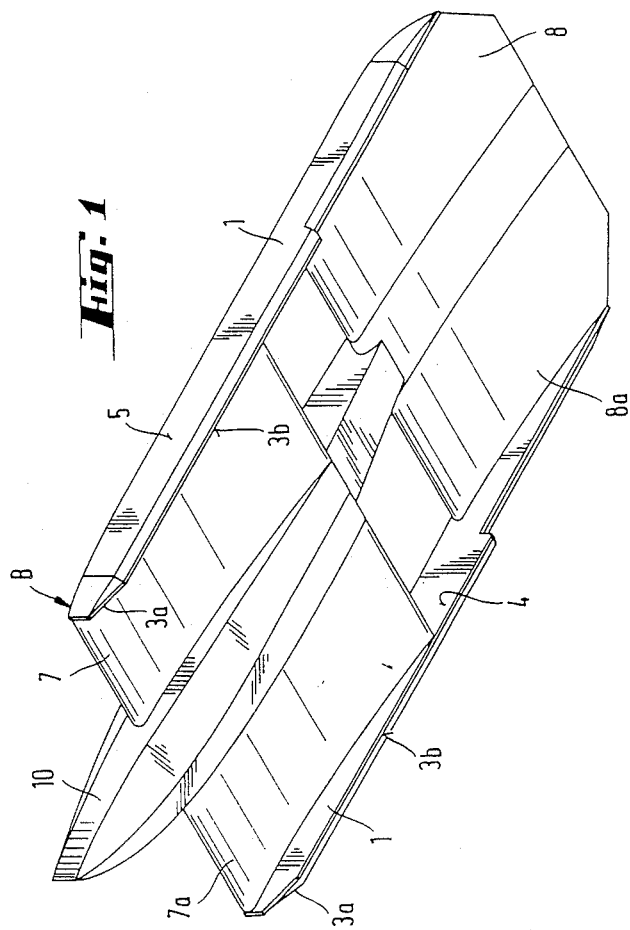
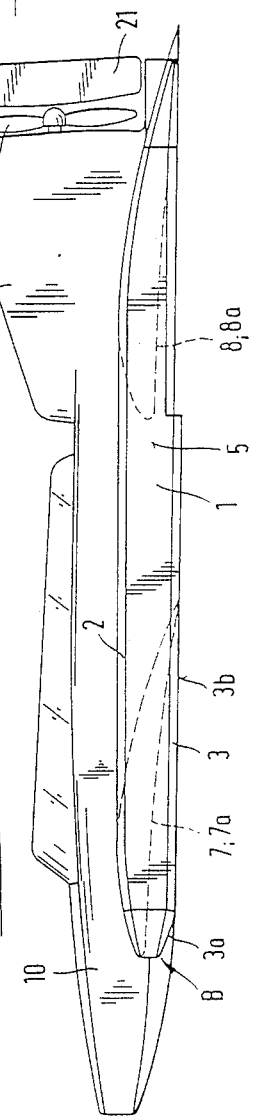

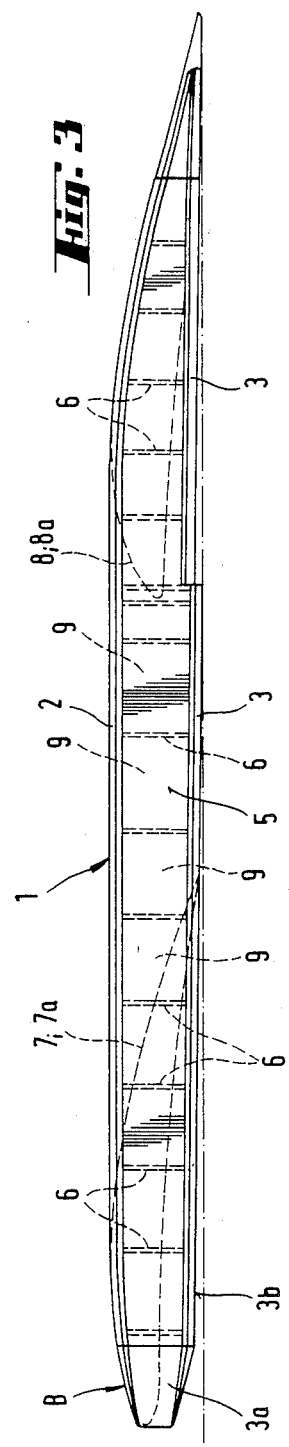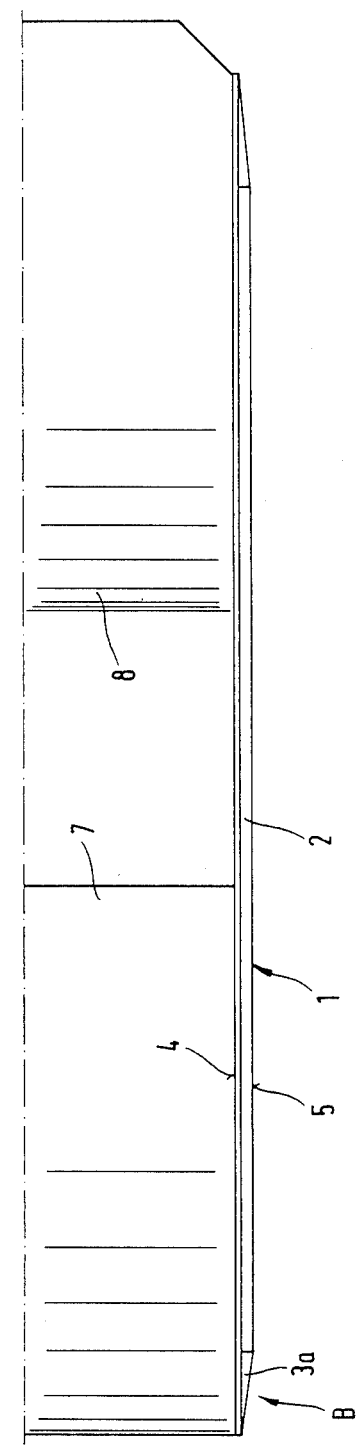

END PLATE FOR A RAM-WING BOAT

BACKGROUND AND SUMMARY OF THE INVENTION

The invention relates to an end plate for a ram-wing boat with, on each hull side, two airfoils, in the form of ailettes, disposed at a distance from each other and in tandem at approximately the same height on the hull, which airfoils are connected with each other by a flat end plate fixed to the outside of the ailettes.

Ram-wing boats of this type have been know for some time. For example, in West German Auslegeschrifts 1 756 013 and 2 303 972, inherently stable aerodynamic ground-effect vehicles based on the tandem-wing principle are described in which the front foil surface is mainly loaded in the lifting sense by the ram air in the aerodynamic ground-effect, while the rear foil surface, as a flight-mechanical control unit which has little dependence on the ground effect, stabilizes the hovering height of the vehicle. The conditions imposed on the foil surfaces of tandem-ram-wing vehicles during the phase of flairing necessitate a differentiated profile configuration and relative disposition of the wings. Thus, West German Auslegeschrift 1 756 013 describes a tandem ground-effect vehicle in which the front foil surface is formed as a parallel chord wing with end plates and the rear foil surface formed as a delta wing spreading out in swept-back manner in the direction of the longitudinal axis of the vehicle.

In West German Auslegeschrift 2 303 972, the foil surfaces are constructed as parallel chord wings separated by a distance of approximately one-half the airfoil section thickness. The profiles of these airfoils are configured in accordance with the lifting or stabilizing requirement predominant for that wing, such that the front airfoil is loaded mainly in the lifting sense from the higher pressure side and the rear airfoil, in contrast, is loaded mainly from the lower pressure or suction side.

From West German Offenlegungsschrift 3 931 020 a ram-wing boat is known in which specially configured foil surface or airfoils are provided. These airfoils are configured as hollow bodies segmented into compartments with fixed or variable intermediate bulkheads. They are ailettes, which are disposed in tandem on both sides of the boat hull. The outside surface of the front and rear ailettes on both sides are in each case connected with each other by a flat end plate, the contour of which corresponds essentially to the line of the boat defined by the airfoils. Spilling of air from the pressure side to the suction side during flairing is prevented or retarded by such end plates. This effect leads to reduction of the induced drag and thus generates an important part of the good near-ground flight efficiency of the airfoils.

Ram-wing vehicles incorporating these principles and embodiments have proved excellent in practical testing. However, although the main focus of interest in the previous research and development of ground-effect vehicles was naturally on the phase of flairing, problems remained unsolved, particularly as they related to the maneuverability in the flairing of the turning flight, to the floating stability, to the static stability in rough seas and to the safety against entrained fuel.

The object of the invention is to so configure the end plates that they contribute to improving the properties of the ram-wing boat, and more precisely those during flairing of the turning flight plus the stability as well as the safety.

This object is achieved by an end plate of the type initially mentioned in that each end plate is configured as a hollow body, which consists of an upper chord, a lower chord and side planking which is reinforced by ribs disposed at a distance form each other in the interior of the hollow space.

Useful further embodiments of the end plate according to the invention are characterized in the subclaims.

The advantages of a so configured end plate are diverse, and contribute significantly to desired properties of a ram-wing boat. By the flat end plates, disposed on both sides, which connect the front and rear ailettes with each other and the contours of which are correspondingly configured, the spilling of air, during flairing, from the pressure side, i.e., the profile underside, to the suction side, i.e., the profile top side, is prevented or retarded. This leads to reduction of the induced drag and thereby contributes to an appreciable portion of the good nearground flight efficiency of the airfoils.

However, the special design of the end plate according to the invention also fulfills further important functions. By the static assemblage of upper and lower chord, planking and ribs, the ram-wing boat is made more seaworthy and safer even in heavy seas. As hollow bodies, the end plates provide for trimaran action to impart more floating buoyancy and floating stability, and therewith additional safety, to the vehicle. The partly or completely watertight zones of the end plate can, when partitioned by bulkheads, also be used as fuel tanks. They are far removed from the hull of the cabin and from the engine room so as to offer additional safety during refuelling, in the event of leaks, and a static load reduction of the airfoil structure. A better distribution of the weight is also possible thereby. A further advantage of the end plates configured according to the invention is that fuel bladders can be installed in the zones which are only partly watertight. Because of the flotation of such bladders during water-displacement travel, for example in the harbor and during berthing, it is guaranteed that even the last fuel traces will be removed and conveyed by the fuel pumps to the engine. The converging upper and lower chords provide the ram-wing boat with a maneuverability which is favorable in particular during turning flight.

It has been found that, especially when the angle between the lower chord and the horizontal is 28° to 35°, preferably 30°, extremely tight turns can be flaired without danger, without the occurrence of the feared swinging around toward the inside curves. This is important most of all in rough seas. The construction also permits landing on the water with side wind, without excessive acceleration forces being caused. Because the zone of the lower chord of both end plates at the bow of the boat is sloped slightly upward in the travel direction, improved sliding conditions are achieved and additional hydrodynamic lifting forces are created during take-off from the water. It is also possible therewith to run safely onto ground, for example sand and gravel. Even during landing on water a slow continuous immersion occurs because this lower edge is sloped upward in the bow direction and, in combination with the outwardly directed slopes of the lower chord, the change from the airborne to the waterborne operation is harmonized.

The invention is explained in more detail by means of an exemplary embodiment illustrated in the drawings.

BRIEF DESCRIPTION OF THE DRAWINGS

FIG. 1 shows a schematic perspective bottom view of a ram-wing boat with a view of the left end plate seen in the flight direction.

FIG. 2 shows a side view of the ram-wing boat with a view of the outside of the left end plate.

FIG. 3 shows a schematic side view of the end plate.

FIG. 4 shows a plan view of the end plate.

FIG. 5 shows a side view of a web plate, the contour of which corresponds to the cross section of an end plate.

DETAILED DESCRIPTION OF THE INVENTION

The illustrated vehicle is a tandem-wing vehicle, in which two foil surfaces forming airfoils 7-8 and 7a-8a are provided symmetrically on each long side of the vehicle hull 10. The airfoils 7 and 8 as well as the airfoils 7a and 8a are disposed at a distance from each other and in tandem at approximately the same height. They are connected with each other in each case by a flat end plate 1 fixed to their outer sides. The contour of the end plate 1 corresponds essentially to the line predetermined by the airfoils 7 and 8.

In the conventional manner, the ram-wing boat is provided with a fin-type control surface 20, and a propelling screw 18 runs in a gap 19 between the fin-type control surface 20 and a rudder 21 (FIG. 2).

As initially explained, the end plates fulfill important functions, and their configuration is of importance for the operation of the ram-wing boat as well as its efficiency and safety.

The end plates on both sides of the vehicle are symmetrically formed, and therefore only one end plate 1 will be described in more detail.

The end plate 1 consists of upper chord 2, lower chord 3 and planking 4 and 5 which together form a substantially hollow body. In the interior of the hollow body of the end plate 1 there are disposed ribs 6 or web plates, which will be described in more detail hereinafter.

The planking 4 is simultaneously that side of the end plate 1 which serves as the airfoil connection. From the long edges of this planking 4 the upper chord 2 and the lower chord 3 each includes a surface at an acute angle with respect to the planking 4. In other words, upper chord 2 and lower chord 3 are disposed, in such a manner that the cross section of the end plate 1 corresponds essentially to a trapezoid. An angle of approximately 28° to 35°, which the sloping lower chord 3 encloses with the horizontal, has proved advantageous. This also makes it possible to flair extremely tight turns. An angle of approximately 30° is preferred.

Another important feature of the end plate 1 is formed by the ribs 6 or web plates, provided at a distance from each other in the hollow space of the hollow body, which make the end plate 1 into a static assemblage, by means of which the end plate 1 acquires high strength.

FIG. 5 shows a rib 6 in an individual diagram. Its contour corresponds to the profile of the end plate 1.

By means of these ribs 6 the hollow body of the end plate 1 is divided into compartments which, when partitioned by bulkheads, can also serve as fuel tanks. Some zones of the end plate 1 are completely watertight and others are partly watertight. In the zones which are only partly watertight, compartments 9 in FIG. 3 for example, fuel bladders can be installed which ensure a particularly good utilization of the residual fuel quantity.

At the bow end B of the ram-wing boat, the end plate 1 is tapered, the end zone 3a of the lower chord sloping slightly upward. As already mentioned, improved conditions both during taking off from and landing on water are achieved by this sloped arrangement and, in combination with the slopes of the lower chord 3 directed outwardly from the planking 4, the change from the airborne to the waterborne operation is harmonized.

Expediently, a narrow zone 3b of the lower chord 3 is reinforced at the transition to the planking 4, in order to serve as sliding protection and to prevent damage to the underside and of the lower chord 3 during possible landing on flat sandy beaches. This zone 3b can be designed as a skid, for example.

FIG. 5 shows a rib 6, as is disposed, for example, in the middle of the end plate 1. It is designed to hold bladders T, the zone 2' being able to be partly watertight and the zone 3' watertight.

I claim:

1. An end plate for a ram-wing boat, the ram-wing boat having a hull and two airfoils in the form of ailettes disposed on each side of the hull, said end plate being connected to an outer surface of the two airfoils located on one side of the hull and comprising an upper chord, a lower chord, inner and outer flat side plankings which connect together the upper and lower chords, said upper and lower chords and inner and outer plankings together defining a substantially hollow body having a longitudinal axis, and a plurality of ribs spaced along the longitudinal axis within said hollow body, said ribs being perpendicular to said longitudinal axis, wherein said inner planking is connected to the two airfoils and said upper and lower chords each includes a surface at an acute with respect to the inner planking so that said end plate is essentially trapzoidal in cross section.

2. The end plate as claimed in claim 1, wherein said end plate has a front end portion located at a bow end of the ram-wing boat, and wherein said front end portion is tapered having a tip, and in said front end portion, said lower chord slopes upward toward the tip.

3. The end plate as claimed in claim 1, further comprising at least one bulkhead withing said hollow body which partitions said hollow body so as to form at least one partly waterweight compartment which can be used as a fuel tank.

4. The end plate as claimed in claim 1, further comprising at least one bulkhead within said hollow body which partitions said hollow body so as to form at least one completely watertight compartment which can be used as a fuel tank.

5. The end plate as claimed in claim 1, further comprising a reinforcing material provided along a portion of said lower chord which adjoins said inner planking.

6. The end plate as claimed in claim 1, wherein the acute angle between the surface of the lower chord and the inner planking is approximately 30°.

* * * * *